United States Patent [19]

Pazzaglia et al.

[11] Patent Number: 4,721,841
[45] Date of Patent: Jan. 26, 1988

[54] CONTROL DEVICE FOR RESISTANCE WELDING POWER SUPPLY

[75] Inventors: Luigi Pazzaglia, Bologna, Italy; Zelimir Belamaric, Pully, Switzerland

[73] Assignee: Cefin S.p.A., Bologna, Italy

[21] Appl. No.: 905,761

[22] Filed: Sep. 9, 1986

[30] Foreign Application Priority Data

Oct. 25, 1985 [IT] Italy .................................. 3581 A/85

[51] Int. Cl.[4] .............................................. B23K 9/10
[52] U.S. Cl. ..................................... 219/110; 219/116; 363/16; 363/95
[58] Field of Search .................. 219/110, 116; 363/16, 363/79, 80, 95, 97, 131

[56] References Cited

U.S. PATENT DOCUMENTS

| | | | |
|---|---|---|---|
| 3,636,298 | 1/1972 | Risberg et al. | 219/108 |
| 4,414,455 | 11/1983 | Schneider et al. | 219/108 |
| 4,499,363 | 2/1985 | Izume et al. | 219/110 |
| 4,554,430 | 11/1985 | Belamaric | 219/110 |

*Primary Examiner*—Patrick R. Salce
*Assistant Examiner*—Jeffrey L. Sterrett
*Attorney, Agent, or Firm*—Balogh, Osann, Kramer, Dvorak, Genova & Traub

[57] ABSTRACT

A control device having a single static converter incorporating a rectifier and stabilizer block and a transistorized inversion block, the output signal of which is controlled by an amplitude and frequency regulator in response to a feedback signal taken off the primary or the secondary winding of the welding transformer. The device features an additional rectifier block located between the output from the secondary winding and the input to the welding rollers.

5 Claims, 4 Drawing Figures

CONTROL DEVICE FOR RESISTANCE WELDING POWER SUPPLY

BACKGROUND of the INVENTION

The invention disclosed relates to an electronic device for controlling the supply of electrical power to resistance welding equipment.

Such a device comprises a frequency converter that supplies the primary winding of the welding transformer with an output voltage having waveshape that is characterized by a pulse train of constant amplitude, and an electronic regulator which is designed to compare a feedback signal, proportionate to amplitude and frequency of the welding current, with its own preset references; on the basis of such comparison, the converter is regulated in such a way that the voltage supplied to the primary winding of the transformer will be of amplitude and frequency of such as produces the prescribed welding current.

In the art field of resistance welding equipment, in particular, such as is employed for lap welding the longitudinal seams of metal box components and the like, the system by which electrical power is supplied to the welding rollers must be capable of producing welded joints that are free from flaws, and possess dimensional and qualitative features which will remain constant in the long term and respond to given specifications, as far as is feasible.

The prior art embraces various power supply devices designed to achieve the aforementioned objects. In one such device, power is supplied by exploiting alternating current with a sine wave shape and raising the frequency in measure such as to match the welding speed required, rotary or static frequency converters often being employed for the purpose. This first type of device is beset by various drawbacks however, amongst which, that of a less than regular transmission of power, accompanied by the need to employ current characteristics, such as the operating frequency, that cannot be allowed to drop below a given threshold; this in turn occasions excessive overheating of the equipment and, clearly enough, somewhat high power consumption.

A second type of device utilizes alternating current not with sine wave, but with what is practically a square wave shape. Square wavelengths offers marked advantages over sine waveshape, since power can be transmitted to the weld material in a more regular fashion, and lower values of current amplitude and frequency can be adopted, thereby gaining a strong attenuation of the equipment's tendency to overheat, and cutting power consumption attributable to the welding process and to cooling of the equipment.

This second type of device demands particularly cumbersome, heavy duty equipment however, and directly related to such a drawback is the specific impediment that, in order to obtain optimum slope control on the square wave welding current, it becomes necessary to utilize two or more frequency converters the alternating output voltages of which will be integrated in phase so as to provide square wave current exhibiting a maximum of slope. In effect, if the slope is sufficiently steep, then inversion of the welding current will come about in a negligible period of time, and a much lower operating frequency can be employed.

Significant progress has been achieved with a third type of device that consists substantially in a converter, connected to the power source, that provides an output pulse train exhibiting constant amplitude and split into alternating positive and negative groups of pulses; the current produced reaches the requisite amplitude during each positive or negative half-period, and in the shortest time possible. Such a device comprises an electronic regulator which compares amplitude and frequency of the welding current with its own preset reference values and, on the basis of such a comparison, regulates the converter in such a way that voltage supplied to the transformer will be of amplitude and frequency such as can produce the prescribed welding current.

With a device of this type, it becomes necessary to operate with the secondary winding of the transformer handling rather high voltage, since the substantially square wave output current from the converter features a steep slope characteristic. Thus one is able to avoid the majority of problems connected with flawed weldments, and with the square wave output, operation at low frequency reduces the tendency of the equipment to overheat.

Nonetheless, there are drawbacks connected with this third type of prior art device, one of which stems from the fact of operating with high voltage levels passing through the secondary winding of the transformer. The need arises for large transformers, and as a result, for enlargement of the converter stage, since current put through the primary winding needs to be of a somewhat high order. There are also limits imposed on welding speed in the case in point since, from a given speed upwards, problems with flaws will reappear; this means that, even operating with high voltage across the secondary winding of the transformer, one is necessarily obliged to step up the operating frequency and thus to accept the overheating-related drawbacks that this entails.

The essential objects of the invention disclosed are those of overcoming the various drawbacks described, solving the problems connected with resistance weld flaws comprehensively, and providing the facility of operating with low voltage levels passing through the secondary winding of the transformer so that use can be made of standard size converters and transformers.

Advantages provided by a device according to the invention are:

the elimination of overheating problems caused by eddy currents, which are reduced to a bare minimum quantifiable at approx 25-30% of the levels in prior art devices;

maximum economy in power consumption attributable to welding and cooling alike, the only dissipation occurring through Joule effect and welding current losses;

improved weld quality, as current is supplied to the welding rollers more regularly and smoothly, and any welding speed can be adopted since the need no longer exists to step up frequency, operating frequency being sufficiently high already, and variable according to requirements.

SUMMARY of the INVENTION

The device disclosed comprises a single block of converter circuitry that produces an output pulse train of constant amplitude, single pulses of which alternate between positive and negative. The output current from the converter appears characteristically as a periodic wave having nil mean value, which charges, according to the time constant of the device overall, within the duration of each positive or negative pulse, and discharges, according to the the same time contant, between the end of one pulse and the beginning of the next.

Current flowing from the secondary winding of the transformer is conditioned by a separate block of rectifier circuitry in such a way as to set up a current pulsating at a positive (or negative) mean value, in which the variation in magnitude is somewhat pronounced. The block of regulator circuitry is in receipt of a current feedback signal taken off the transformer's primary or secondary winding, and permits of varying both frequency and amplitude of the output voltage from the converter in such a way as to generate current at the welding rollers that may be varied according to the frequency and the amplitude oscillations of the pulsating component.

With a device thus embodied, welding can take place at any given speed dictated by requirements, since the welding frequency remains high, and in any event can be adjusted by way of the regulator facility; high frequency has no effect whatever on the welding equipment in terms of overheating, and in point of fact, the tendency to overheat is reduced to a bare minimum. The optimum weld for a given application is obtained by varying the magnitude of the pulsating current to a greater or lesser degree, between the maximum and minimum available.

With a device according to the invention, one can operate with low voltage levels handled by the secondary winding, thereby eliminating heating problems from the welding equipment, and at high frequency, thus overcoming problems with flawed weldments.

The facility of varying the pulsation amplitude of current supplied to the welding rollers, and modifying its frequency if appropriate, signifies clearly that the device can be utilized to full and faultless effect for any given resistance welding application.

BRIEF DESCRIPTION of the DRAWINGS

The invention will now be described in detail, by way of example, with the aid of the accompanying sheet of drawings, in which.

DESCRIPTION of the PREFERRED EMBODIMENT

Figure 1:
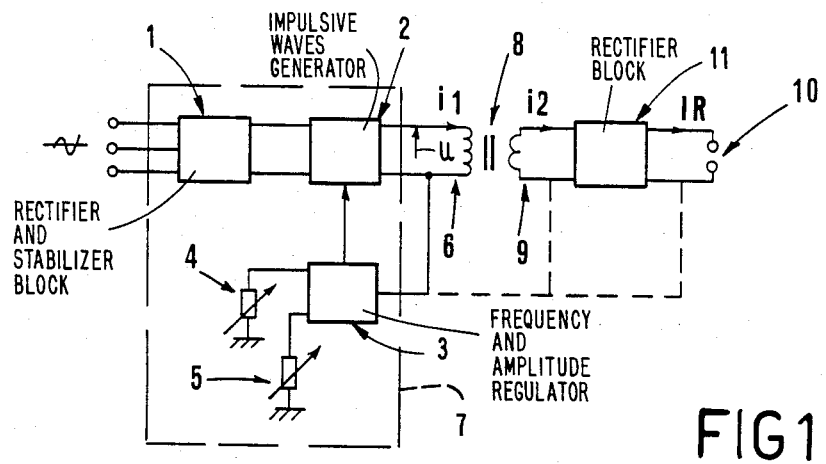
FIG. 1 shows a block diagram of the electronic device disclosed.

With reference to the accompanying drawings, and to FIG. 1 in particular, the device disclosed consists in a single static frequency converter 7 which comprises a single rectifier and stabilizer block 1, capable of supplying a direct voltage to the input of a fully transistorized impulsive wave generator 2, and an electronic regulator 3 in receipt of a current feedback signal from either the primary 6 or the secondary winding 9 of the transformer 8; the regulator is connected to amplitude and frequency sources 4 and 5, which in FIG. 1 are symbolized as potentiometers.

The essential, and original feature of the electronic device is that it also comprises an additional block 11 of rectifier circuitry, located at the secondary winding 9 of the transformer 8 and cascading into the welding rollers 10, the function of which will ultimately become clear.

Figure 2:
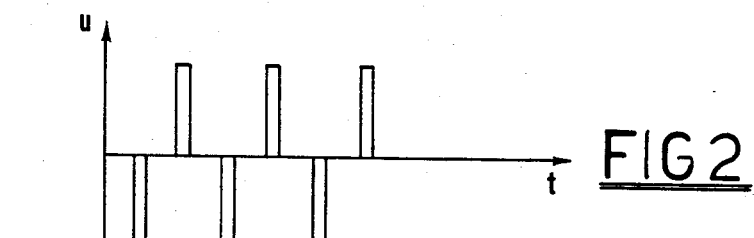
FIG. 2 illustrates the voltage output signal from the converter of FIG. 1.

The impulsive wave generator 2 supplies an output voltage u (see FIG. 2) to the primary winding 6 of the transformer 8, the pulse train of which exhibits constant amplitude; pulse duration will vary automatically according to the resistance of the material being welded, and is not of a high order, since the device does not feature operation with high levels of voltage put through the transformer's secondary winding. Single pulses of the output voltage u alternate between positive and negative.

Figure 3:
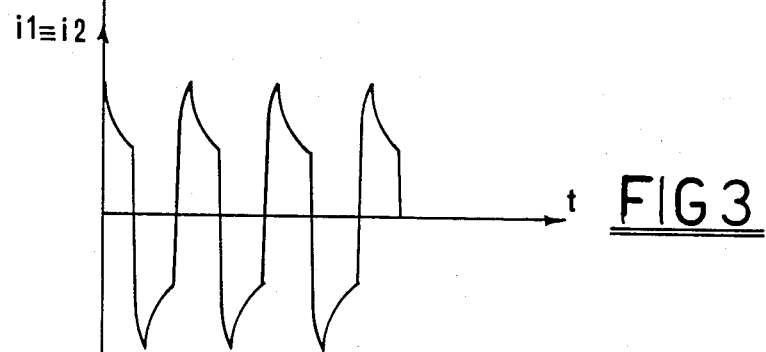
FIG. 3 illustrates output current from the secondary winding of the transformer of the device.

The output current i1 from the converter 7, which is proportional in terms of waveshape to the current i2 which flows through the secondary winding 9 of the transformer and into the rectifier block 11, appears as illustrated in FIG. 3. Charge of the current i1 takes place within the duration of each positive or negative pulse of the voltage u, according to the time constant of the device, whereupon discharge occurs during the time which lapses between the end of the single pulse and the beginning of the next.

Figure 4:
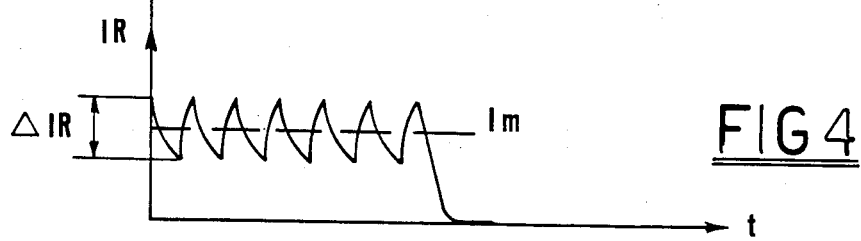
FIG. 4 illustrates the welding current as supplied by the device.

The additional rectifier block 11 conditions current i2 passing through the secondary winding 9 of the transformer 8, and generates an output, the welding current IR, the waveshape of which is shown FIG. 4. The waveshape of the welding current IR could thus be described as having mean value Im, positive or negative, and pulsating, and may be likened to a ripple current the variation $\Delta$IR in magnitude of which is somewhat pronounced. If therefore, the frequency of the current i1 or i2 is f, then frequency of the welding current IR is equal to 2f.

It has been observed, following various experiments, that welding current IR may be characterized by high operating frequency (500 to 2000 Hz) without the equipment overheating in the least, and in effect, levels of overheating are kept to some 2530% of the levels commonly encountered in prior art devices. Also, it has been found that the $\Delta$IR characteristic (which is pronounced, it will be recalled), contributes to better and more efficient welding.

Selection of the optimum welding current IR to suit the nature of the material welded, and the welding speed, is achieved using the potentiometers 4 and 5 to set the regulator 3 at values of amplitude and frequency calculated to provide the right input to the impulse wave generator 2—viz, by varying amplitude, it becomes possible to vary $\Delta$IR, and by varying frequency, the frequency of the welding current IR may be adjusted, clearly enough. Such adjustments are effected on the basis of a current feedback signal relayed to the regulator 3 from either the primary or the secondary winding of the transformer; in the latter instance, the take-off point may be at the input or the output side of the rectifier block 11. It will be clear enough to one skilled in the art, that in the event of the welding current IR not responding exactly to selected amplitude and frequency parameters, this will be remedied by the electronic regulator 3 almost instantaneously.

Thus embodied, the device permits of operating with low voltage levels across the secondary winding of the transformer, as there is no need for a steep current slope characteristic at each inversion with operation at high frequency; the problems connected with flawed weldments are therefore eliminated. It will be remembered, finally, that with low voltage levels handled by the secondary winding, the welding equipment can be run off standard size transformers and converters.

Needless to say, a variety of circuit options may be adopted in embodiment of the converter and of the rectififer block 11, without prejudice to the invention's patentability, provided that these incorporate the features described above and claimed below.

What is claimed is:

1. Control device for resistance welding power supply, in particular as used in metal box construction, comprising:

a single frequency converter comprising a rectifier and a stabilizer block supplying direct output voltage to the input of a fully transistorized impulsive wave generator, said impulsive wave generator in turn supplies a primary winding of a welding transformer with a low output impulsive voltage, the single impulsive waves of which alternate between positive and negative;

a rectifier block located at a secondary winding of the transformer supplying welding rollers with a high frequency welding current having a pronounced ripple of steady current intensity that is a function of the frequency and of the amplitude of the impulsive wave generator output voltage; and an electronic regulator which compares the amplitude and frequency of the welding current ripple with its own respective preset reference sources and is feedback connected to the impulsive wave generator so that its output voltage will be of an amplitude and frequency such as to produce said welding current ripple.

2. Device as in claim 1, wherein the variation in amplitude and frequency of the welding current ripple can be selected and varied by way of reference sources connected to the electronic regulator.

3. Device as in claim 1, wherein the operating frequency of the welding current ripple is at least equal to the frequency of the impulsive wave generator output voltage.

4. Device as in claim 3, wherein the operating frequency of the impulsive wave generator may vary from approximately 500 Hz to approximately 2000 Hz.

5. Device as in claim 1, wherein the operating frequency of the welding current ripple is at least double the frequency of the impulsive wave generator output voltage.

* * * * *